United States Patent [19]
Lintz

[11] Patent Number: 5,687,556
[45] Date of Patent: Nov. 18, 1997

[54] RAKE SYSTEM INCLUDING RAKE-LIKE ARM EXTENSIONS

[76] Inventor: David R. Lintz, 1775 NW. 137th, Portland, Oreg. 97229

[21] Appl. No.: 589,946

[22] Filed: Jan. 23, 1996

[51] Int. Cl.⁶ ............................................. A01D 7/00
[52] U.S. Cl. ............................ 56/400.01; 56/400.12; 294/50.6; 294/57
[58] Field of Search .................. 56/400.01, 400.11, 56/400.12, 400.16, 400.19; 294/50.5, 50.6, 55, 57; D8/3, 13

[56] References Cited

U.S. PATENT DOCUMENTS

| D. 297,101 | 8/1988 | Licht . |
| D. 308,805 | 6/1990 | Licht . |
| 2,180,544 | 11/1939 | Nissen . |
| 2,546,113 | 3/1951 | Spang . |
| 2,652,279 | 9/1953 | Morris . |
| 2,710,571 | 6/1955 | Pfister . |
| 4,378,670 | 4/1983 | Check et al. . |
| 4,866,922 | 9/1989 | Clark . |

*Primary Examiner*—Terry Lee Melius
*Attorney, Agent, or Firm*—Kolisch, Hartwell, Dickinson, McCormack & Heuser

[57] ABSTRACT

A rake system is provided which includes a pair of rake-like arm extensions, each having a multi-tine rake head mounted on an improved ergonomic handle. The handle employs an extension shaft which attaches to the rake head, and a grip shaft which projects from the extension shaft at an acute angle so as to define an angled user handhold. A forearm brace extends between the extension shaft and grip shaft, the forearm brace being configured to engage the back side of the user's forearm so as to oppose pivot of the rake head about the user handhold when debris is picked up. The extension and grip shafts preferably are configured to run substantially parallel to one another in a leverage region which extends from corresponding alignment bends of the shafts to the handle's proximal end.

19 Claims, 2 Drawing Sheets

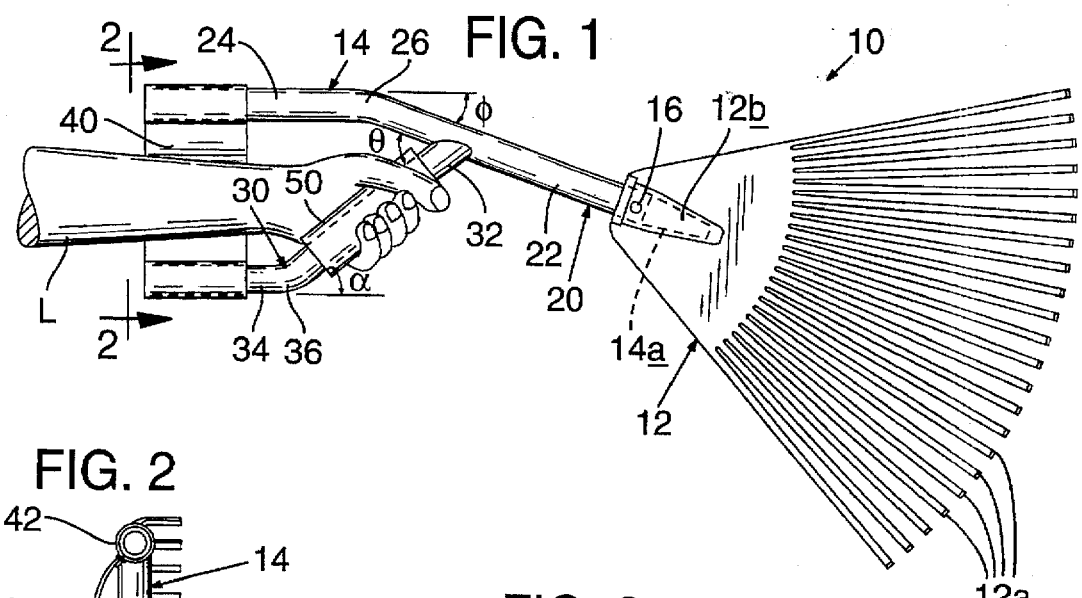
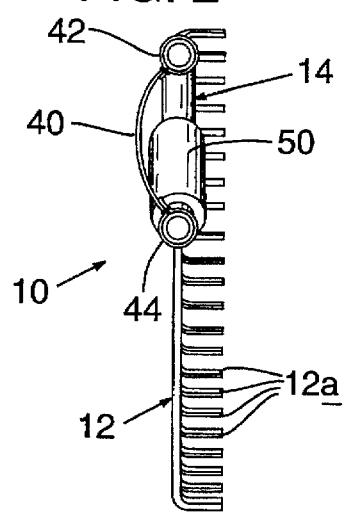
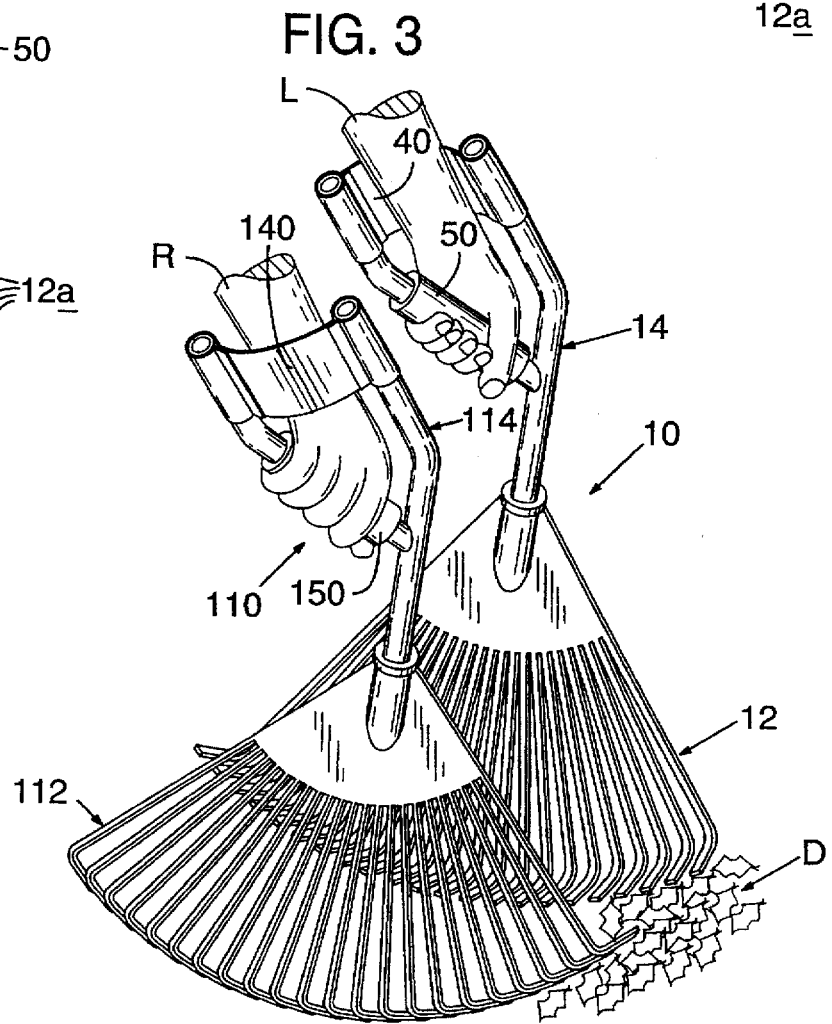

RAKE SYSTEM INCLUDING RAKE-LIKE ARM EXTENSIONS

TECHNICAL FIELD

The present invention relates generally to debris collection, and more particularly, to a rake system which includes rake-like arm extensions whereby debris such as leaves may be gathered, lifted and carried away.

BACKGROUND ART

For many years now, it has been common to collect yard debris using rakes of the type defined by a generally straight gripping handle to which is secured a fan-shaped multi-tine head. Such rakes are particularly useful in gathering articles such as leaves, the fines being configured to accommodate collection of loose articles by sweeping the rake's head across the ground. The handle typically is of a length which allows the user to stand generally upright, the user gripping the handle adjacent a distal end with both hands and pulling the rake toward himself/herself to form a debris pile.

Unfortunately, although conventional rakes are well-suited for gathering debris into piles, they have been less effective in picking up the debris and delivering it to a trash receptacle. This is due in part to the cumbersome nature of most conventional rake handles, and in part to the absence of a suitable opposing surface against which the rake head may act when picking up a leaf pile. The fact that the handle is relatively straight also makes the handle difficult to grip, and the rake head difficult to control. It will be appreciated, for example, that conventional rake handles are prone to rotating within a user's hands, often due to an uneven load on the rake head. This, in turn, may lead to spilling or dumping of debris which is carried by the rake head. Users thus will typically grip a rake at or near its head when picking up debris, thereby at least marginally improving control over the rake head. This, however, does little to reduce the cumbersome nature of the rake, or to reduce the other difficulties encountered when using a conventional rake. In fact, gripping the rake at its head may make use of the rake more cumbersome, and will require the user to bend to an unsafe lifting posture when picking up debris. Furthermore, the manner in which a user grips the rake may detract from the amount of leverage afforded to the user, and thus can make it unnecessarily difficult to pick up large amounts of debris.

In an attempt to address some of the problems associated with conventional rakes, scoop-like devices have been developed for use in picking up debris and delivering it to a trash receptacle. These devices typically take the form of baskets which have been fitted with some sort of handhold so that they may be used in opposition to pick up small amounts of debris. One such device is described in U.S. Pat. No. 4,378,670 to Check et al., which is entitled "Hand Scoop for Grass and Leaves." That patent describes a pair of concave scoops (one for each hand) which are gripped through finger holes. Another device is described in U.S. Pat. No. 2,546,113 to Spang, which is entitled "Arm Scoop." That patent describes a basket-like scoop having a transverse hand grip and a corresponding arm brace. Neither device, however, is suitable for use as an overall raking tool. Such devices are useful only in picking up debris which has already been gathered, and then, only small amounts of such debris. This typically is due to the small size of the scoops, the absence of significant leverage, and/or the unnatural manner in which the scoops must be gripped. Furthermore, conventional scoop devices may cause back injury, such devices typically being gripped on the scoop portion so as to require users to bend to an unsafe lifting posture when picking up debris.

It therefore would be desirable to provide a rake system employing a pair of rake-like arm extensions which may be comfortably and reliably gripped to accommodate gathering debris, picking up the debris, and delivering the debris to a trash receptacle.

DISCLOSURE OF THE INVENTION

In accordance with the present invention, a rake system is provided which includes a pair of rake-like arm extensions, each having a multi-tine rake head mounted on an improved ergonomic handle. The handle employs an extension shaft which attaches to the rake head, and a grip shaft which projects from the extension shaft at an acute angle so as to define an angled user handhold. A forearm brace extends between the extension shaft and grip shaft, the forearm brace being configured to engage the back side of the user's forearm so as to oppose pivot of the rake head about the user handhold when debris is picked up. The extension and grip shafts preferably are configured to run substantially parallel to one another in a leverage region which extends from corresponding alignment bends of the shafts to the handle's proximal end.

The grip shaft typically projects from the extension shaft at a position which is approximately 10-inches from the rake head. In the preferred embodiment, the grip shaft projects from the extension shaft in a proximal direction at an angle of approximately 60-degrees, thereby providing a comfortable user handhold. Thereafter, the grip shaft typically defines a 45-degree alignment bend, such bend generally corresponding to a similar 15-degree alignment bend of the extension shaft so as to provide the handle with a leverage region wherein the extension and grip shafts run substantially parallel to one another. When using the rake system, each of the user's arms is placed in a corresponding arm extension, the arm typically lying generally parallel to the shafts within the handle's leverage region. Each handhold thus typically extends across a user's hand at an angle of approximately 45-degrees relative to the direction in which the user's arm extends.

In one embodiment of the invention, the system further includes a resilient panel biased toward an orientation wherein the panel defines a nominally planar sheet. The resilient panel, however, is configurable in a generally cylindrical orientation which may be inserted into a collapsible debris sack so as to provide increased structural integrity to such sack. Once inside the sack, the panel will tend toward its planar orientation, but will be prevented from achieving such orientation by the sack's side walls. The sack thus will be held in a generally cylindrical open orientation, providing a normally open receptacle for receipt of the gathered debris.

These and additional objects and advantages of the present invention will be more readily understood after a consideration of the drawings and the detailed description which follows.

BRIEF DESCRIPTION OF THE DRAWINGS

FIG. 1 is a top plan view of a rake-like arm extension constructed in accordance with a preferred embodiment of the invention, such arm extension being configured for grip by a user's left arm, the user's arm being shown to demonstrate the ergonomic advantage which the invention offers.

FIG. 2 is an end view of the arm extension shown in FIG. 1.

FIG. 3 is an isometric view illustrating use of a pair of rake-like arm extensions similar to that shown in FIG. 1, such arm extensions being used in concert to pick up a pile of debris.

Figure 4A:
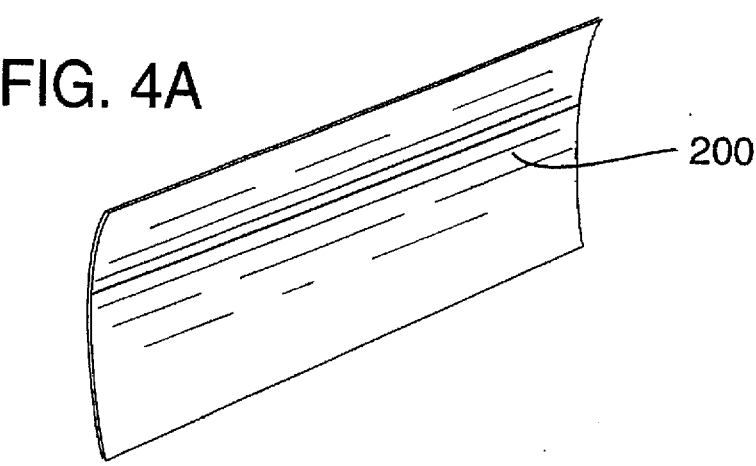
FIGS. 4A–4C are isometric views which demonstrate adaptation of a resilient panel such that it may be used to hold a debris sack open.

DETAILED DESCRIPTION OF THE PREFERRED EMBODIMENT AND BEST MODE OF CARRYING OUT THE INVENTION

FIG. 1 shows, at 10, a rake-like member which is configured to provide a user with an arm extension for use in collecting debris, picking it up, and delivering it to a receptacle such as a debris sack. Member 10 takes the form of a left arm extension, a mirror image right arm extension (110 in FIG. 3) also typically being provided for right-hand use. Together, the left and right arm extensions define a unique rake system which will be described in detail below.

Focussing initially on arm extension 10, it will be noted that such arm extension includes a multi-tine rake head 12 mounted on an ergonomic handle 14. Rake head 12 includes a plurality of tines 12a, which accommodate collection of materials such as leaves, grass or other yard debris. The rake head also defines a pocket 12b which is configured for receipt of one end of the handle, such end typically being tapered as indicated generally at 14a. The rake head is secured to the handle via a fastener 16 which prevents the rake head from rotating on the handle when the fastener is in place.

In the preferred embodiment, the handle is formed from an injection molded plastic to make the handle relative lightweight while maintaining the structural integrity required to pick up debris. It will be appreciated, however, that the handle similarly may be formed from virtually any material which can be configured in the manner shown and described herein. For example, nylon or aluminum tubing may be employed.

The ergonomic handle is generally Y-shaped, including an extension shaft 20 which extends from the rake head, and a grip shaft 30 which projects from the extension shaft so as to provide an angled user handhold. Handle 14, for example, is configured for use in connection with a user's left arm L, the grip shaft extending from the extension shaft at an acute angle θ such that the grip shaft may be comfortably gripped as shown. In the preferred embodiment the grip shaft projects from the extension shaft at a position which is approximately 10-inches from the rake head, the grip shaft projecting in a proximal direction at an angle θ of approximately 60-degrees.

Referring now to FIGS. 1 and 2, the reader will see that extension shaft 20 includes a first extension section 22 and a second extension 24, the first and second extension sections defining an alignment bend 26 approximately 14-inches from the rake head. In the depicted handle, alignment bend 26 is defined by an angle φ which typically is between approximately 10-degrees and 20-degrees, and preferably is approximately 15-degrees. The grip shaft similarly includes a first grip section 32 and a second grip section 34, the first and second grip sections defining an alignment bend 36 which is approximately 6½-inches from its intersection with the extension shaft. Alignment bend 36 is defined by an angle α which is selected to compliment angle φ so as to make second extension 24 section and second grip section 34 parallel. In the depicted embodiment, angle α is selected to be between approximately 40-degrees and 50-degrees, and preferably is approximately 45-degrees. The sum of angles φ and α thus is approximately equal to angle θ, resulting in the establishment of a leverage region wherein the extension and grip shafts run substantially parallel to one another. The second grip section also is approximately 6½-inches long. The second extension section is approximately 8-inches long.

A forearm brace 40 is mounted at or near the proximal end of the handle, such brace extending between the extension shaft and grip shaft in the leverage region as shown. The brace is configured to engage the back of the user's forearm, thereby providing opposition to pivot of the handle about the user handhold. In the preferred embodiment, the forearm brace is provided with opposite sleeves 42, 44, each sleeve being sized to capture either the extension shaft or the grip shaft. The extension shaft and grip shaft are approximately 8-inches apart in the leverage region.

In the preferred embodiment forearm brace 40 is made from a somewhat flexible material, providing for reversibility of the unit. Forearm brace 40 may be nylon, or may be plastisol-dipped so as to provide a somewhat stiff forearm brace with enough bow to allow either right-or left-hand use. Where the forearm brace is flexible, it is possible to adapt a left arm extension unit for right hand use by simply removing screw 16, rotating rake head 12 by 180-degrees, and reapplying fastener 16. A right hand extension unit similarly can be made ambidextrous simply by providing for rotation of the rake head. Those skilled will appreciate that a rigid forearm brace similarly may be used, such brace simply being fitted with tubular sleeves which are adapted for reversible application to the extension and grip shafts.

The grip shaft further may be fitted with a cushion 50 which enhances the user's grip and comfort, thereby further improving the handle's ergonomic design. In the preferred embodiment, cushion 50 takes the form of a slip-on foam bicycle handle grip. FIG. 1 shows the manner in which the user grips the handle, his or her hand lying in a natural orientation with the first grip section extending diagonally across the palm of the user's hand. This increases user endurance, and decreases the risk of injury to the user's wrist.

In FIG. 3 a right arm extension 110 is shown, such right arm extension being gripped by the user's right hand and used in connection with left arm extension 10. As should be apparent, arm extension 110 includes a rake head 112, the handle 114, an associated forearm brace 140, and a grip 150. The two arm extensions are used cooperatively in a manner similar to the way an individual would use his or her hands to pick up debris such as that shown at D. Arm extension 10 and 110 thus truly do act as extensions of the user's arms. This allows the user to pick up debris from a more natural standing position, lessening the degree the user must bend over and decreasing the risk of back injury. This is due in part to the 10-inch span between the rake head and the user handhold, and in part to the leverage which is provided by the counter-engaging forces of the forearm brace and the hand grip.

Figure 4B:
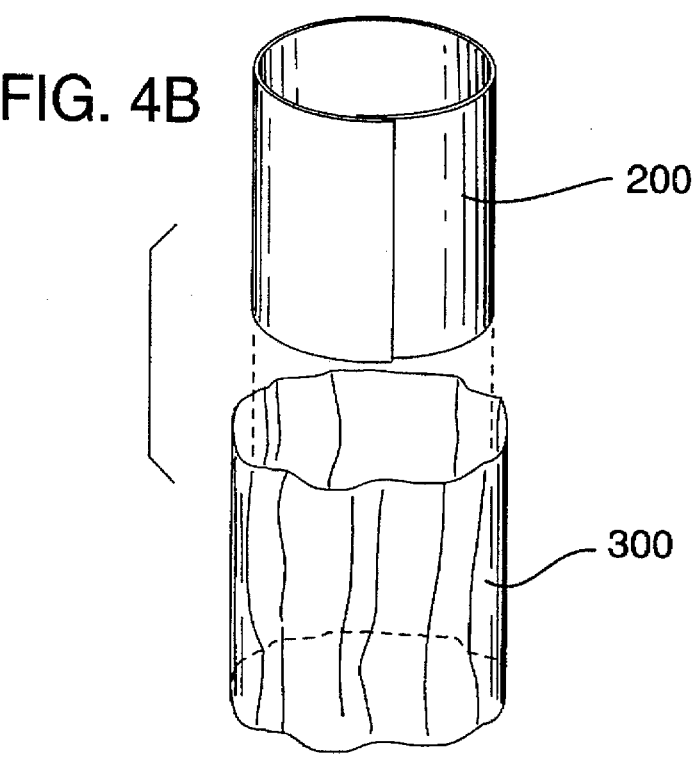
Figure 4C:
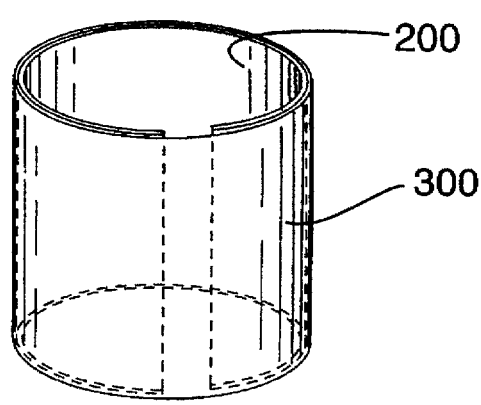

Turning now to FIGS. 4A–4C, it will be appreciated that, in one embodiment of the invention, the system further includes a resilient panel 200 which is biased toward an orientation wherein the panel defines a nominally planar sheet. The sheet is not completely planar, however, but rather includes a slight top-to-bottom bow. The panel is shown in its nominal first orientation in FIG. 4A. FIG. 4B shows panel 200 in a second orientation, such orientation being made possible by the generally flexible nature of panel 200. As indicated, panel 200 has been rolled into a cylindrical form typically of a diameter which will allow the cylindrically-formed panel to be deposited in a receptacle such as a conventional yard debris sack 300. Panel 200, however, is biased toward the orientation indicated in FIG. 4A, and thus will tend toward such orientation once the user's grip has been released. Therefore, upon placing the panel within debris sack 300, the panel will cylindrically-expand, thereby urging the walls of sack 300 into a cylindrical orientation as indicated in FIG. 4C. Upon reaching a fully open orientation, the sack will prevent further expansion of the panel, and will provide a readily usable container for deposit of debris. The user thus is able to simply pickup debris with the arm extensions and deposit the debris in the sack without putting down the arm extensions. To remove the panel is simply (i.e., cylindrically retracted) deflected slightly and pulled from the open sack. The full sack then may be closed and put out for pick up by an appropriate debris pick-up service.

While the present invention has been shown and described with reference to the foregoing operational principles and preferred embodiment, it will be apparent to those skilled in the art that various changes in form and detail may be made without departing from the spirit and scope of the invention as defined by the claims.

I claim:

1. A rake system comprising:

a rake head;

a handle including an elongate extension shaft secured to said rake head and an elongate grip shaft projecting proximally from said extension shaft at an acute angle, thereby defining a user handhold which is angled relative to said extension shaft; and a forearm brace extending between said extension shaft and said grip shaft, said forearm brace opposing pivot of said rake head about said user handhold.

2. The rake system of claim 1, wherein said grip shaft projects from said extension shaft at an angle of approximately 60-degrees.

3. The rake system of claim 1, wherein said extension shaft and said grip shaft each define an alignment bend, said extension and grip shafts thus being configured to run substantially parallel to one another proximally to said alignment bends.

4. The rake system of claim 3, wherein said grip shaft alignment bend is at an angle α of between approximately 40-degrees and 50-degrees.

5. The rake system of claim 3, wherein each alignment bend is at an angle whereby a sum of said alignment bend angles is approximately equal to said acute angle at which said grip shaft projects from said extension shaft.

6. The rake system of claim 1, wherein said grip shaft projects from said extension shaft at an angle of approximately 60-degrees, said extension shaft defines an alignment bend of approximately 15-degrees, and said grip shaft defines an alignment bend of approximately 45-degrees.

7. The rake system of claim 1, wherein said grip shaft projects from said extension shaft at a position which is approximately 10-inches from said rake head.

8. The rake system of claim 1 which further comprises a resilient cushion which overlies said grip shaft along a section extending between said extension shaft and said grip shaft alignment bend.

9. A rake system comprising:

a left arm extension including a first multi-fine rake head, a generally Y-shaped left arm handle and a left forearm brace, said left arm handle having a first elongate extension shaft which secures to said first rake head and a first elongate grip shaft which projects proximally from said first extension shaft at an acute angle to define a handhold for a user's left hand, said left forearm brace extending between said first extension shaft and said first grip shaft to engage the user's left arm, thereby opposing pivot of said first rake head about said left arm handhold; and a right arm extension including a second multi-tine rake head, a generally Y-shaped right arm handle and a right forearm brace, said right handle having a second elongate extension shaft which secures to said second rake head and a second elongate grip shaft which projects proximally from said second extension shaft at an acute angle to define a handhold for a users right hand, said right forearm brace extending between said second extension shaft and said second grip shaft to engage the user's right arm, opposing pivot of said second rake head about said right arm handhold.

10. The rake system of claim 9, wherein said left and right arm extensions are configured for ambidextrous use by 180-degree rotation of a corresponding rake head.

11. The rake system of claim 9, wherein each grip shaft projects from a corresponding extension shaft at an angle of approximately 60-degrees.

12. The rake system of claim 9, wherein said extension shafts and grip shafts each define an alignment bend, corresponding extension and grip shafts of each handle being configured to run substantially parallel to one another proximally to said alignment bends.

13. The rake system of claim 9, wherein each grip shaft projects from a corresponding extension shaft at an angle of approximately 60-degrees, each extension shaft defines an alignment bend of approximately 15-degrees, and each grip shaft defines an alignment bend of approximately 45-degrees.

14. The rake system of claim 9, wherein each grip shaft projects from a corresponding extension shaft at a position which is approximately 10-inches from a corresponding rake head.

15. The rake system of claim 1 which further comprises a resilient panel for use in connection with a collapsible receptacle, said panel being biased toward an orientation wherein said panel is planar, but being configurable in a generally cylindrical orientation for insertion into the collapsible receptacle, thereby providing increased structural integrity to the receptacle.

16. A rake system for use in gathering debris, picking up the debris, and delivering the debris to a collapsible receptacle, said rake system comprising:

a left arm extension including a first multi-tine rake head, a generally Y-shaped left arm handle and a left forearm brace, said left arm handle having a first elongate extension shaft which secures to said first rake head and a first elongate grip shaft which projects proximally from said first extension shaft at an acute angle of approximately 60-degrees to define a handhold for a user's left hand, said first extension shaft defining a first extension shaft alignment bend of approximately 15-degrees toward said first grip shaft and said first grip shaft defining a first grip shaft alignment bend of approximately 45-degrees toward said first extension shaft, said first extension shaft and said first grip shaft thus being configured to run substantially parallel to one another in a first leverage region which is proximate to said left handle alignment bends, said left forearm brace extending between said first extension shaft and said first grip shaft in the first leverage region to engage the user's left arm, thereby opposing pivot of said first rake head about said left arm handhold;

a right arm extension including a second multi-tine rake head, a generally Y-shaped right arm handle and a right forearm brace, said right handle having a second elongate extension shaft which secures to said second rake head and a second elongate grip shaft which projects proximally from said second extension shall at an acute angle of approximately 60-degrees to define a handhold for a user's right hand, said second extension shaft defining a second extension shaft alignment bend of approximately 15-degrees toward said second grip shalt and said second grip shaft defining a second grip shaft alignment bend of approximately 45-degrees toward said second extension shaft, said second extension shaft and said second grip shaft thus being configured to run substantially parallel to one another in a second leverage region which is proximate to said right handle alignment bends, said right forearm brace extending between said second extension shaft and said second grip shaft in the first leverage region to engage the user's right arm, thereby opposing pivot of said second rake head about said right arm handhold; and a resilient panel biased toward an orientation wherein said panel is planar, but being configurable in a generally cylindrical orientation for insertion into the collapsible receptacle, thereby providing increased structural integrity to the receptacle.

17. The rake system of claim 16, wherein each grip shaft projects from a corresponding extension shaft at a position which is approximately 10-inches from a corresponding rake head.

18. The rake system of claim 17, wherein each extension shaft bend is approximately 14-inches from a corresponding rake head, and each grip shaft bend is approximately 6½-inches from a corresponding extension shaft intersection.

19. The rake system of claim 18, wherein each extension shaft extends proximally approximately 8-inches from a corresponding extension shaft bend, and each grip shaft extends approximately 6½-inches from a corresponding grip shaft bend.

* * * * *